June 23, 1925.  1,543,016
C. A. LARE
COMBINED PHOTOGRAPHIC PRINTER AND ENLARGER
Filed June 27, 1923
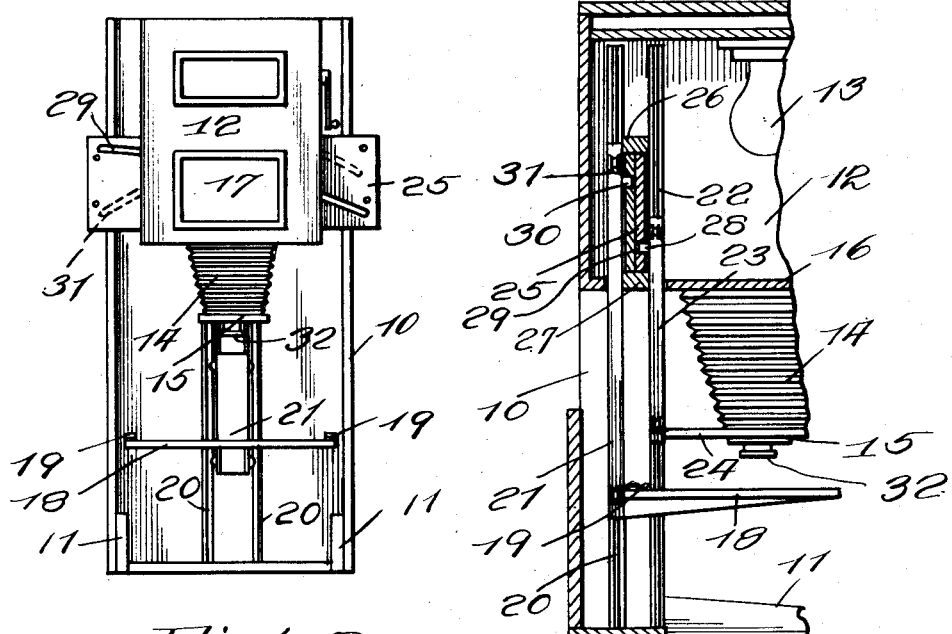
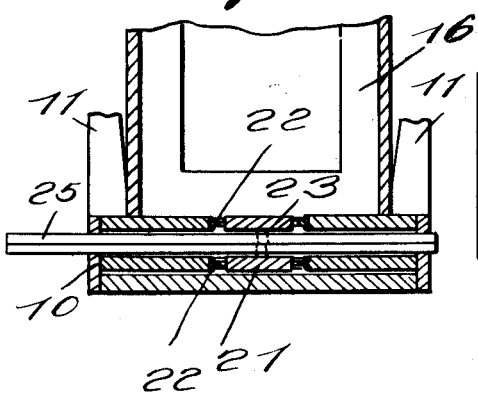
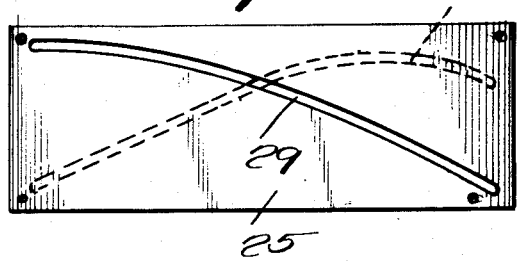
Inventor
Charles A. Lare
By Watson E. Coleman
Attorney Patented June 23, 1925.

1,543,016

UNITED STATES PATENT OFFICE.

CHARLES A. LARE, OF BALTIMORE, MARYLAND.

COMBINED PHOTOGRAPHIC PRINTER AND ENLARGER.

Application filed June 27, 1923. Serial No. 648,072.

*To all whom it may concern:*

Be it known that I, CHARLES A. LARE, a citizen of the United States, residing at Baltimore and State of Maryland, have invented certain new and useful Improvements in Combined Photographic Printers and Enlargers, of which the following is a specification, reference being had to the accompanying drawings.

This invention relates to improvements in enlarging, reducing and copying cameras, and particularly to certain improvements on the form of camera illustrated in my prior application Serial #573,596, filed July 8, 1922, and my application filed March 5, 1923, Serial #622,945.

The general object of the present invention is to provide means for controlling the movements of the easel and lens of a camera or of the lens and negative support of a camera whereby the lens and the negative support or the sensitized paper support may be shifted coincidently from a position giving maximum enlargement to a position giving the minimum reduction of which the machine is capable and at all times maintaining the lens at the proper focal distance from the easel or from the negative during all points of travel.

A further object is to provide a device of this character which is extremely simple, does not require any complicated cam mechanism, springs or the like, and in which the relatively movable parts are held at all times in proper adjusted position.

A still further object is to provide a device of this character in which the means for moving the relatively movable members comprises a plate mounted preferably for movement transverse to the movement of the said members, this plate having two cam tracks thereon which cross each other, the cam tracks being respectively connected to their corresponding movable parts.

Another object is to provide a construction of this character in which the easel and the lens carrier of the camera are respectively connected to the cam tracks of said plate, these cam tracks being arranged to cross each other so that when the plate is in its middle position the easel and the lens carrier will be so disposed that an image will be thrown upon the sensitized paper of the same size as the image on the negative, and that when the plate is shifted only in one direction a maximum reduction will be secured, that is the image thrown on the sensitized paper will be smaller than the size of the image on the negative, and when the plate is fully shifted in the opposite direction the image thrown on the sensitized paper will be much larger than the image on the negative, the adjustment of the cam plate from its middle position to either of its fully adjusted positions gradually increasing or gradually decreasing the size of the image thrown upon the easel and the sensitized sheet, the contour of the cam tracks being such as to secure a proper movement of the lens with relation to the movement of the easel and holding the easel and the lens carrier in their adjusted positions.

Other objects will appear in the course of the following description.

My invention is illustrated in the accompanying drawings, wherein:—

Figure 1 is a front elevation of an enlarging camera constructed in accordance with my invention;

Figure 2 is a fragmentary vertical sectional view thereof looking from front to rear;

Figure 3 is a section on the line 3—3 of Figure 2;

Figure 4 is a front elevation of the cam plate 25.

Referring to these drawings, it will be seen that I have illustrated a vertical camera, that is one wherein the sensitized sheet is supported in a horizontal position and where the lens and the easel supporting the sensitized sheet move vertically. Such cameras may either be supported from the wall or floor as may be desired. It will be understood, however, that the principle of my invention might be applied to a horizontally disposed camera.

The structure which I have illustrated in the drawings includes the side members 10 which form the principal supports for the camera and which are spaced from each other. These side members, as illustrated, are provided with feet 11 at their lower ends for supporting the members 10 in a vertical position. Secured to the upper ends of these supports is a light box 12 supporting therein the electric lamp 13. Any other source of illumination might be used, however. To the lower end of this light box is connected the bellows 14 having at its lower end the lens carrier 15. Disposed within the light box is a negative support 16 of glass or other suitable transparent or translucent material upon which the negative may be disposed. The front of the box is provided with an opening having a door 17 whereby the negative may be slipped into or out of place. Suitable means, of course, are provided whereby access may be had to the lamp for changing it. Slidably mounted upon the supports 10, as will be hereafter described, is an easel 18 upon which the sensitized sheets are to be supported, these sensitized sheets being held in place by clips 19 or in any other suitable manner. So far I have described merely the essentials of what is known as an enlarging or reducing camera.

Disposed between vertical guides 20 carried by the supports 10 is a slide 21 to which the easel 18 is attached. This slide 21 is guided on the rails or guides 20 for vertical movement, and disposed between vertical guide rails 22 is a slide 23 which carries upon it the lens carrier 15 as, for instance, by means of a bracket 24 projecting out from the slide. Transversely slidable just below the camera box is a cam plate 25 which is disposed between horizontal guiding members 26 and 27 operatively supported by the members 10. This cam plate 25 is formed upon each face with a cam groove. The slide 23 which is connected to the lens carrier is provided with a roller 28 which engages in the cam groove 29 formed in one face of the cam plate 25, while the slide 18 carries upon it an inwardly projecting roller or equivalent member 30 which is engaged with a cam track 31 formed upon the rear face of the cam plate 25. These cam tracks, as illustrated, are in the form of grooves in the opposite faces of the plate 25 and these cam tracks intersect each other so that as the plate is moved in one direction or the other the lens carrier and the easel will be moved relative to each other. The cam track 29, it will be seen from Figure 4, extends upward and laterally from the right hand corner of the plate in a slight curve and at a relatively steep angle for nearly its entire length and then curves in a direction nearly parallel to the upper edge of the plate. The cam track 31, however, extends upward at a relatively steep angle to the approximate center of the plate, where it intersects the plane of the cam track 29, and then extends in a flattened curve, the chord of which is approximately parallel to the upper edge of the plate. It will be seen that the chord of cam track 29 is at all points at an angle to the longitudinal edge of the cam plate. It will be likewise noted from Figure 4 that while the cam track 29 extends upward to a point closely adjacent the upper edge of the plate, the curved portion of the cam track 31 is below the upper portion of the cam track 29.

While I do not wish to be limited to the exact shape of the cam tracks illustrated, yet it will be noticed that these shapes are such as to give the proper relative movements to the easel and to the lens carrier, or where the negative is movable and the easel is fixed, to the negative and the lens carrier. It will be seen that with this construction the groove or cam track 29 is so formed as to move the lens carrier slide and accordingly the lens carrier itself toward or from the easel at a fixed rate of speed upon a movement of the slide in one direction or the other, the rate of speed depending upon the speed at which the cam plate is manually shifted. The cam groove 31 or track is so formed, however, as to maintain the easel 18 constantly at the focus of the lens 32 during the travel thereof and at the same time so position the easel during this travel that while the lens carrier and its slide are moving from the lowermost point of travel to the highest point thereof, the easel is moved initially toward the lens carrier at a speed less than the speed of movement of the lens carrier upward and subsequently moved away from the lens carrier. When the cam is in its middle position the rollers 28 and 30 are directly opposite each other and the image thrown upon the sensitized sheet will be of the same size as the negative. When the cam plate 25 is shifted toward the left in Figure 1, the easel will move upwardly slightly and eventually downwardly slightly, while the lens will be moved continuously downward, thus bringing the easel and lens very close together to thus secure a diminution of the picture, in other words a reduced picture. When the cam plate is moved from its middle position toward the right in Figure 1, it is obvious that the lens will travel upward in the cam groove 29 until it reaches the upper portion of said groove and then will be held practically in the same plane, while on the other hand the easel moves constantly downward at a uniform rate of speed, thus securing a proper focusing of the lens upon the sensitized paper, this focusing being entirely automatic, the operator not having to adjust the focus at all but simply move the cam plate. By adjusting this cam plate in one direction or the other, it will be obvious that any desired reduction of the image may be secured or any desired enlargement of the image and that at all times the lens plate and the easel are held in proper relation to focus the picture sharply upon the sensitized sheet.

The angles given to the cam tracks are such that the cam tracks will hold the slides in their adjusted position without any extraneous means and that all the operator has to do is to shift the slidable cam plate 25 in one direction or the other in order to secure a proper adjustment of the lens and easel and secure a sharp image at all times. This device does not require any springs, weights or like means for resisting the shifting movement of the easel and lens carrier, it is extremely simple, and may be readily operated.

It will be understood that I have only illustrated a very simple embodiment of my invention for the reason that the present invention relates merely to the manner in which the easel and the lens carrier or the lens carrier and the negative holder or support may be coincidently shifted to secure any desired enlargement or reduction and secure a sharp focus for the picture at all times. Therefore, I have not attempted to illustrate any other details of construction and it is obvious that these details will be modified in many different ways without departing from the spirit of the invention. It is also obvious that this method of moving the lens carrier and easel or the lens carrier and the negative support might be applied to a horizontally arranged camera as well as to a vertically arranged camera. It will furthermore be obvious that while no means have been illustrated for moving the cam, that such means will be provided in cases where it is found necessary or advisable.

I claim:—

1. In a mechanism of the character described, a supporting structure, a source of light, a lens carrier, a sensitized paper supporting member, a negative supporting member, means for coincidently shifting the lens and one of said members relative to each other comprising an actuating member having two cam tracks in different planes and crossing each other, and means operatively connecting one of said members with one of said tracks and the lens carrier with the other track.

2. In a mechanism of the character described, a supporting structure, a source of light, a lens carrier, a sensitized paper supporting member, a negative supporting member, means for coincidently shifting the lens and one of said members relatively to each other comprising an actuating member having two cam tracks one on each face of the actuating member and crossing each other, the actuating member being manually movable in a line diagonal to each cam track, and means operatively connecting one of said members with one of said tracks and the lens carrier with the other track.

3. In a mechanism of the character described, a supporting structure, a source of light, a lens carrier, a sensitized paper supporting member, a negative supporting member, means for coincidently shifting the lens and one of said members relatively to each other comprising a plate extending transversely to the path of movement of the lens carrier and the coacting member and having two cam tracks, the cam tracks crossing each other, and means operatively connecting one of said members with one of said tracks and the lens carrier with the other track.

4. In a mechanism of the character described, a supporting structure, a source of light, a lens carrier, a sensitized paper supporting member, a negative supporting member, means for coincidently shifting the lens and one of said members relatively to each other comprising a plate having two cam tracks on opposite faces of the plate, the cam tracks crossing each other, guides upon the supporting structure between which the plate is manually shiftable, and means operatively connecting one of said members with one of said tracks and the lens carrier with the other track.

5. In a mechanism of the character described, a supporting structure and a source of light, a lens carrier movable with relation to the source of light, a sensitized paper supporting member toward which the lens is directed, a negative supporting member disposed between the lens carrier and the source of light, means for coincidently shifting the lens and one of said members relatively to each other comprising a cam plate mounted upon the supporting structure for movement transverse to the length of the supporting structure and having two cam tracks crossing each other at the middle of the plate, and means operatively connecting one of said members with one of said tracks and the lens carrier with the other of said tracks, one of said tracks extending approximately diagonally with relation to the plate and with the upper end portion of the cam track extending approximately parallel to the path of travel of the plate, the other cam track extending upwardly and laterally on a diagonal line to a point where it intersects the first named track and then extending in an upwardly bowed curve, the chord of said curve being in line with the intersection of said tracks and approximately parallel to the path of travel of the plate.

6. In a mechanism of the character described, a supporting structure and a source of light, a lens carrier movable with relation to the source of light, a sensitized paper supporting member toward which the lens is directed, a negative supporting member disposed between the lens carrier and the source of light, means for coincidentally shifting the lens and one of said members relatively to each other comprising a cam plate mounted upon the supporting structure for movement transverse to the length of the supporting structure and having two cam tracks crossing each other at the middle of the plate, and means operatively connecting one of said members with one of said tracks and the lens carrier with the other of said tracks, one of said tracks extending in a curve whose chord is diagonal with relation to the length of the plate, the other cam track extending upwardly and laterally on a diagonal line to a point where it intersects the first named track and then extending in an upwardly bowed curve, the chord of said curve being in line with the intersection of said tracks and approximately parallel to the path of travel of the plate.

7. A photograhic printing apparatus including a source of light, a lens, means for supporting the element to be printed intermediate the lens and light, a sentitized paper support, means for shifting the lens toward and away from the source of light, means simultaneously shifting the support to maintain the same continuously at the focal point of the lens throughout its travel from a desired maximum enlargement focus to a desired minimum reduction focus, a common operating element for both of said means, said element comprising a member shiftable transversely of the path of movement of the lens and support and having two cam tracks thereon, one coacting with the lens to shift it and the other with said paper support to shift it, and means operatively connecting the lens and the support to their respective cam tracks.

8. A photographic printing apparatus including a source of light, a lens, means for supporting the element to be printed intermediate the lens and light, a sensitized paper support, means for shifting the lens toward and away from the source of light, means simultaneously shifting the support to maintain the same continuously at the focal point of the lens throughout its travel from a desired maximum enlargement focus to a desired minimum reduction focus, a common operating element for both of said means, said means comprising a plate movable transversely of the path of movement of the lens and paper support, said plate having thereon two cam tracks, the cam tracks extending approximately diagonally of the plate and crossing each other, and means operatively connecting the lens and the sensitized paper support to their respective cam tracks.

9. A photographic printing apparatus including a supporting structure, a source of light mounted thereon, a negative support, a bellows disposed between the negative support, a lens carrier connected to the bellows, the carrier being movable longitudinally of the structure, a sensitized paper support mounted upon the structure for movement toward or from the lens carrier, means for shifting the lens carrier toward and away from the source of light and simultaneously shifting the paper support to maintain the same continuously at the focal point of the lens throughout its travel from a desired maximum enlargement focus to a desired minimum reduction focus and including guides mounted upon the structure, a plate manually shiftable between said guides in opposite directions from a neutral position, said plate having cam tracks crossing each other at the middle of the plate, and means operatively connecting the lens to one of said cam tracks and the sensitized paper support to the other cam track.

In testimony whereof I hereunto affix my signature.

CHARLES A. LARE.